(12) United States Patent
Surraco

(10) Patent No.: US 10,365,005 B2
(45) Date of Patent: Jul. 30, 2019

(54) STAINLESS STEEL FOIL LAMINATED PLASTIC HVAC DUCT AND METHOD OF MAKING SAME

(71) Applicant: Fernando Surraco, Montclair, NJ (US)

(72) Inventor: Fernando Surraco, Montclair, NJ (US)

( * ) Notice: Subject to any disclaimer, the term of this patent is extended or adjusted under 35 U.S.C. 154(b) by 15 days.

(21) Appl. No.: 15/648,045

(22) Filed: Jul. 12, 2017

(65) Prior Publication Data
US 2019/0017723 A1    Jan. 17, 2019

(51) Int. Cl.
| F16L 9/00 | (2006.01) |
| F24F 13/02 | (2006.01) |
| B32B 15/18 | (2006.01) |
| B32B 15/20 | (2006.01) |

(52) U.S. Cl.
CPC .......... *F24F 13/0281* (2013.01); *B32B 15/18* (2013.01); *B32B 15/20* (2013.01); *F24F 13/0245* (2013.01); *F24F 13/0263* (2013.01); *B32B 2307/304* (2013.01); *B32B 2307/3065* (2013.01); *B32B 2419/00* (2013.01); *F16L 9/003* (2013.01)

(58) Field of Classification Search
CPC ..... F16L 59/026; F16L 59/029; F16L 55/161; F16L 55/0336
USPC ............................. 138/149, DIG. 4, 114, 148
See application file for complete search history.

(56) References Cited

U.S. PATENT DOCUMENTS

| 3,019,850 A | 2/1962 | March |
| 3,251,382 A | 5/1966 | Tatsch |
| 3,434,502 A | 3/1969 | Snelling |
| 3,557,840 A * | 1/1971 | Maybee ............... F16L 59/026 138/149 |
| 5,310,594 A * | 5/1994 | Holland ............. B29C 44/5654 428/167 |
| 5,918,644 A * | 7/1999 | Haack ..................... F16L 9/003 138/146 |
| 6,161,593 A * | 12/2000 | Lardillat ............... F16L 59/147 138/120 |
| 6,227,271 B1 | 5/2001 | Pourmand et al. |
| 6,953,512 B2 * | 10/2005 | Cohen .................... B32B 15/08 156/248 |
| 8,186,387 B2 * | 5/2012 | Wadsworth ......... F16L 55/0336 138/143 |
| 8,667,995 B1 * | 3/2014 | Fanelli ............... F24F 13/0245 138/112 |
| 9,840,050 B2 * | 12/2017 | Lanciaux ............. B29D 23/001 |

(Continued)

FOREIGN PATENT DOCUMENTS

CN           201159371 Y    12/2008

OTHER PUBLICATIONS

International Search Report and Written Opinion received in PCT/US18/41462, dated Oct. 16, 2018, pp. 8.

*Primary Examiner* — Patrick F Brinson
(74) *Attorney, Agent, or Firm* — Liang & Frank, LLP; Lawrence H. Frank

(57) ABSTRACT

A flame-resistant, insulated, plastic HVAC duct including a channel configured for conveying forced air and a duct wall forming the channel, the duct wall including a plastic layer disposed between a thermally insulating layer and a metal foil layer. The metal foil layer is arranged to form an outer surface of the duct wall, and the thermally insulating layer is arranged to form an inner surface of the duct wall. A second metal foil layer may be disposed between the thermally insulating layer and the plastic layer.

20 Claims, 7 Drawing Sheets

(56) References Cited

U.S. PATENT DOCUMENTS

| | | | |
|---|---|---|---|
| 2004/0014382 A1* | 1/2004 | MacAulay | B29C 44/1228 |
| | | | 442/23 |
| 2004/0118472 A1* | 6/2004 | Mota | F16L 9/003 |
| | | | 138/149 |
| 2005/0000585 A1 | 1/2005 | Betley et al. | |
| 2006/0054235 A1* | 3/2006 | Cohen | B32B 15/08 |
| | | | 138/149 |
| 2006/0083889 A1* | 4/2006 | Schuckers | B32B 3/02 |
| | | | 428/58 |
| 2013/0291984 A1* | 11/2013 | Himmel | F16L 59/02 |
| | | | 29/428 |
| 2014/0261846 A1 | 9/2014 | Lanciaux | |
| 2014/0290783 A1 | 10/2014 | Fanelli | |

* cited by examiner

STAINLESS STEEL FOIL LAMINATED PLASTIC HVAC DUCT AND METHOD OF MAKING SAME

FIELD OF INVENTION

The present invention is directed to a heating, ventilation and air conditioning (HVAC) duct and, more particularly, to an insulated HVAC duct having walls constructed from stainless steel foil laminated plastic sheets or panels.

BACKGROUND OF INVENTION

HVAC ducts made of plastic are known in the art. For example, U.S. Pat. No. 8,667,995 discloses an HVAC duct for use in an HVAC system. The duct includes a plastic outer tube having a fully continuous external perimeter, a plastic inner tube capable of conveying forced air and a plurality of plastic support elements spanning between the outer tube and the inner tube. The support elements extend along the inner tube and the outer tube lengthwise and define a plurality of channels between the outer tube and the inner tube. A plurality of thermally insulating layers is contained within the channels.

A shortcoming of plastic HVAC ducts is their inability to withstand direct exposure to flames. Because of this deficiency, plastic HVAC ducts often fail to meet building codes that incorporate UL standards including, for example, UL 181 (Flame Penetration Test), which sets forth requirements for factory-made air ducts and air connectors. An HVAC plastic duct that fails to meet this standard is not suitable for installation in those jurisdictions that have adopted UL standards. Accordingly, there is a need for an HVAC plastic duct that is flame resistant.

SUMMARY OF INVENTION

The present invention is directed to a flame resistant, insulated, plastic HVAC duct. According to one aspect of the invention, there is provided an HVAC duct including a channel configured for conveying forced air and a duct wall forming the channel, the duct wall including a plastic layer disposed between a thermally insulating layer and a metal foil layer. The metal foil layer is arranged to form an outermost surface of the duct wall, and the thermally insulating layer is arranged to form an innermost surface of the duct wall. The metal foil layer covering the outermost surface of the duct imparts flame resistance to the duct sufficient to meet or exceed UL standards. A flame retardant paint can be applied to the outermost surface of the duct wall to further improve the flame resistance of the duct.

According to another aspect of the invention, there is provided an HVAC duct including a channel configured for conveying forced air and a duct wall forming the channel, the duct wall including a first plastic layer disposed between a thermally insulating layer and a first metal foil layer as well as a second plastic layer disposed between the thermally insulating layer and a second metal foil layer. The second foil layer is arranged to define an axially-extending, continuous boundary of the channel. Together, the first foil layer and the second foil layer fully encapsulate the thermally insulating layer and first and second plastic layers of the duct wall and thereby impart flame resistance to both the exterior and interior surface of the HVAC duct.

According to another aspect of the invention, there is provided an HVAC duct including a duct wall having a first stainless steel foil sheet laminated to a first surface of a first plastic sheet. The duct wall is arranged to form a first hollow tube having a seam formed by an overlap of the duct wall with itself. The outermost surface of the first hollow tube is formed entirely or substantially entirely by the first stainless steel foil sheet. The duct wall may include a second stainless steel foil sheet laminated to a second plastic sheet, the second stainless steel foil sheet and the second plastic sheet being operatively coupled to the first stainless steel foil sheet and the first surface of a first plastic sheet. In this embodiment, the duct wall includes a spaced defined by and between the first plastic sheet and the second plastic sheet. The space is preferably filled with an insulating material having an R-value that is greater than the R-value of the first and second plastic sheets.

According to another aspect of the invention, there is provided a method of making an HVAC duct including laminating a first steel foil sheet to a first plastic sheet to form a first wall member and arranging the first wall member to form a first tube having an outer surface formed entirely by the first steel foil sheet. A thermal insulator may be adhered to the first plastic sheet on a surface opposite the first steel foil sheet prior to formation of the first tube. When forming an HVAC system from the duct, a second steel foil sheet may be laminated to a second plastic sheet to form a second wall member, and the second wall member arranged to form a second tube. The first tube is coupled to the second hollow tube with the first tube and the second tube being arranged to form a contiguous channel configured for conveying forced air through both tubes. A source of forced air may then be operatively coupled to the contiguous channel for supplying forced air through the HVAC system.

According to yet another aspect of the invention, there is provided an HVAC duct including a channel configured for conveying forced air and a duct wall forming the channel, the duct wall having an outer surface and an inner surface. The duct wall includes a plastic layer laminated between a stainless steel foil layer and an aluminum foil layer. A thermally insulating layer is coupled directly to the aluminum foil layer and is arranged to form the innermost surface of the duct wall. The duct wall is arranged into a tube having an outer surface consisting entirely or substantially entirely of the stainless steel foil layer.

According to another aspect of the invention, there is provided an HVAC duct including a channel configured for conveying forced air and a duct wall forming the channel, the duct wall including a first plastic layer disposed between a stainless steel foil layer and an aluminum foil layer, a thermally insulating layer disposed between the aluminum foil layer and a second aluminum foil layer, and a second plastic layer disposed between the second aluminum foil layer and a second stainless steel foil layer. The second foil layer is arranged to define an axially-extending, continuous boundary of the channel. Together, the first foil layer and second foil layer fully encapsulate the insulating layer, the first and second plastic layers, and the first and second aluminum foil layers of the duct wall and thereby impart flame resistance to both the exterior and interior surface of the HVAC duct.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE DRAWINGS

Figure 1:
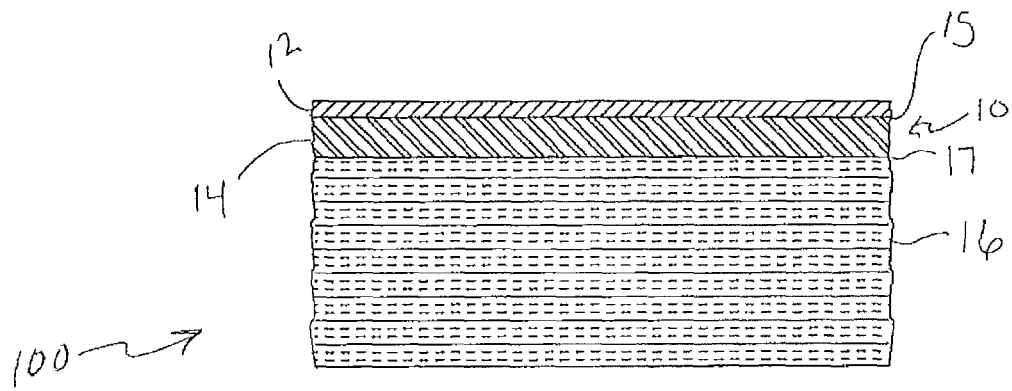
FIG. 1 is a sectional view of a duct wall in accordance with a first embodiment of the present invention.
Figure 6:
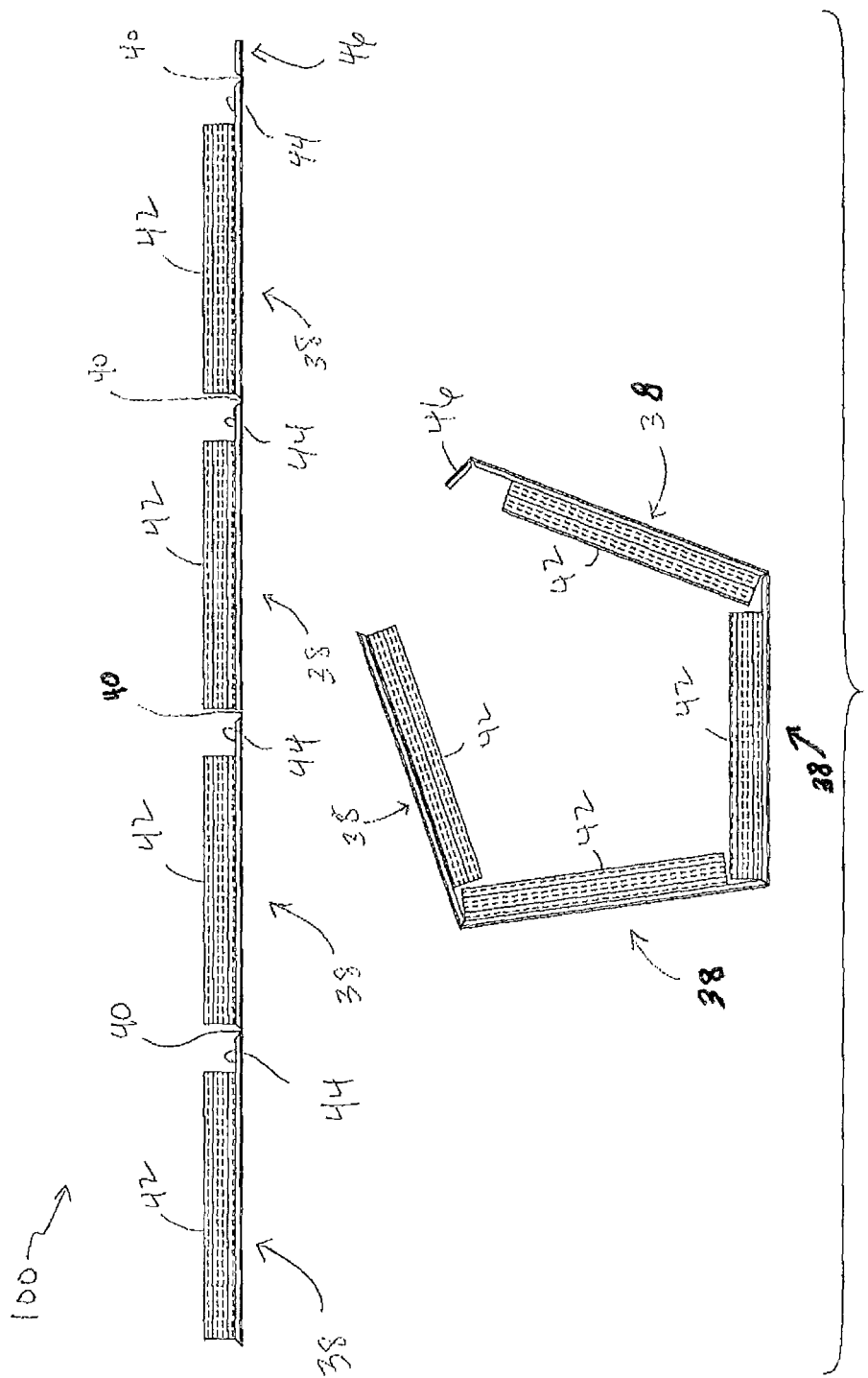
FIG. 6 is an elevational view of the HVAC duct of FIG. 3 in various stages of construction.
Figure 8:
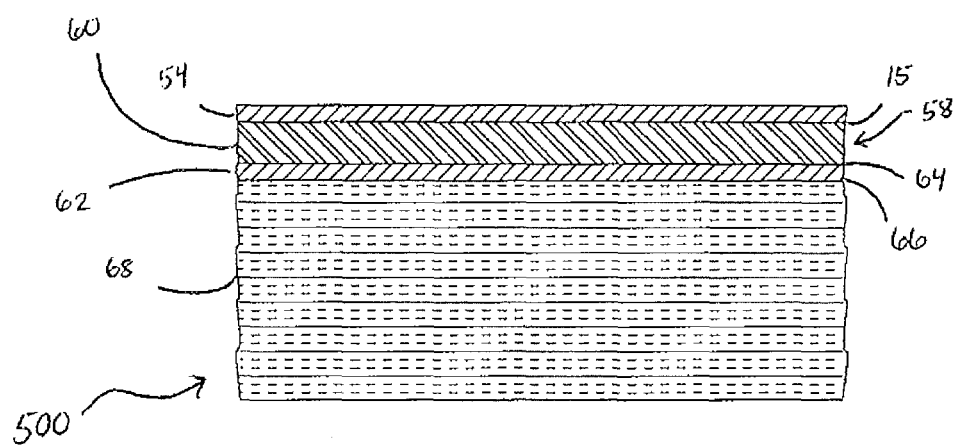
FIG. 8 is a sectional view of a duct wall in accordance with a third embodiment of the present invention.
Figure 9:
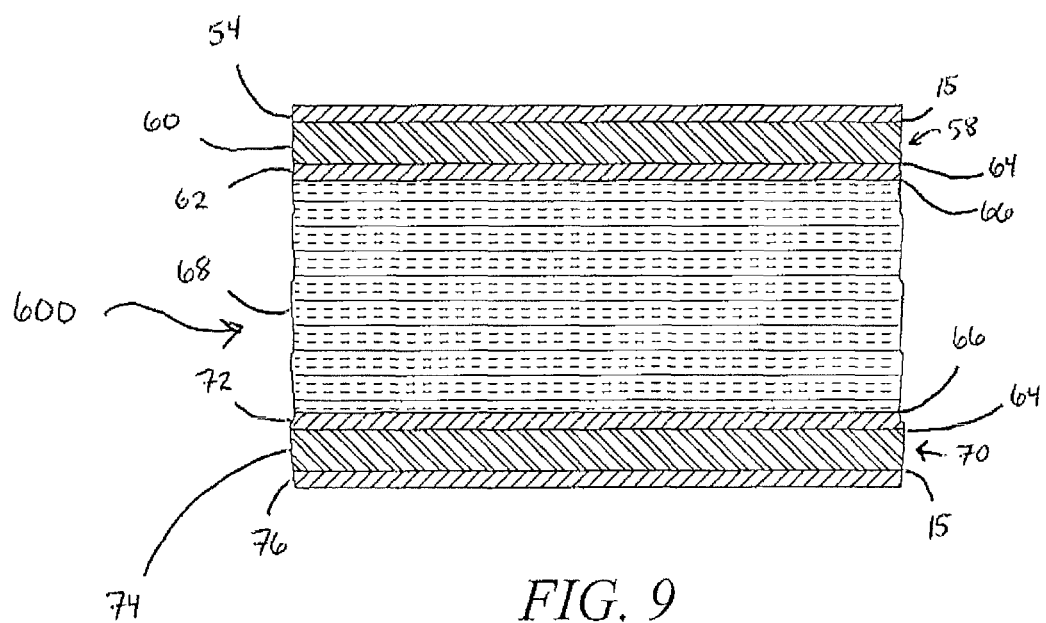
FIG. 9 is a sectional view of a duct wall in accordance with a fourth embodiment of the present invention.
Figure 10:
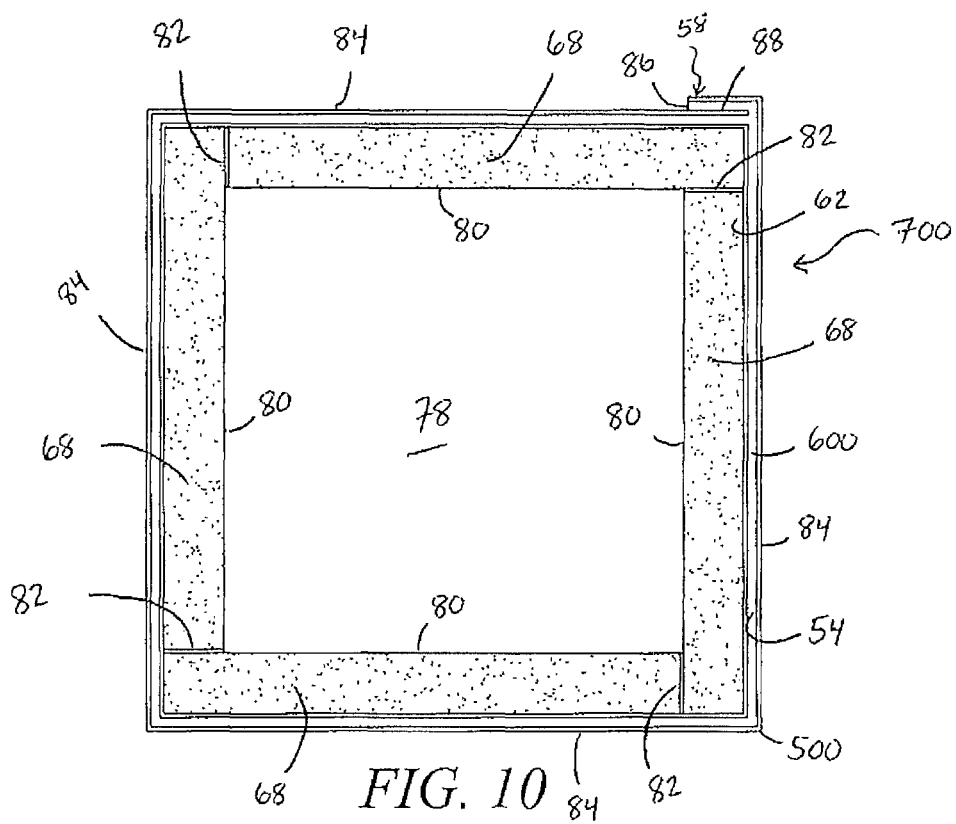
FIG. 10 is a sectional view of an HVAC duct formed by the duct wall of FIG. 8.
Figure 11:
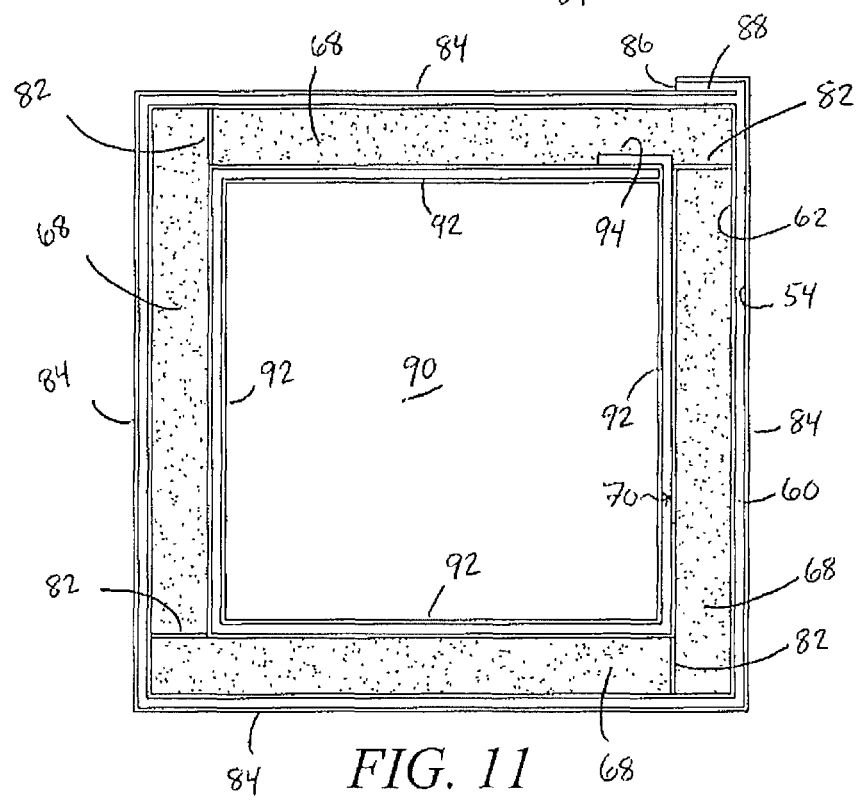
FIG. 11 is a sectional view of an HVAC duct formed by the duct wall of FIG. 9.

The present invention is generally directed to an HVAC duct including an insulated duct wall fabricated from a laminate composed of plastic and metal foil. The plastic provides rigidity to the duct wall, while the metal foil improves flame-resistance and, in particular, resistance to flame penetration, of the duct wall. FIGS. 1, 3 and 6 depict an HVAC duct wall 100 in accordance with a first embodiment of the present invention. Duct wall 100 is configured for imparting flame-resistance to the exterior surfaces of an HVAC duct constructed therefrom. FIGS. 2, 4, 5 and 7 depict an HVAC duct wall 200 in accordance with a second embodiment of the present invention. Duct wall 200 is configured for imparting flame-resistance to the exterior and interior surfaces of an HVAC duct constructed therefrom. FIGS. 8 through 11 depict HVAC duct walls that are fabricated from a laminate comprised of a plastic sheet laminated directly between opposing metal foil sheets. FIGS. 8 and 10 depict an HVAC duct wall 500 in accordance with a third embodiment of the present invention. Duct wall 500 is configured for imparting flame-resistance to the exterior surfaces of an HVAC duct constructed therefrom. FIGS. 9 and 11 depict an HVAC duct wall 600 in accordance with a fourth embodiment of the present invention. Duct wall 600 is configured for imparting flame-resistance to the exterior and interior surfaces of an HVAC duct constructed therefrom. The HVAC ducts of the present invention are operative for use in an HVAC system for conveying forced air from a forced air source.

Referring to FIG. 1, there is depicted a sectional view of duct wall 100. Duct wall 100 includes a first laminate 10 composed of a metal foil 12 adhered to a plastic sheet 14. Metal foil 12 can be any metal foil or metal alloy foil that is capable of improving the flame resistance of duct wall 100. For purposes of this invention, metal foil refers to a thin sheet of metal, usually hammered or rolled flat, having a thickness of less than 7.8 mils. Preferably, metal foil 12 is a stainless steel foil having a thickness of 5.0 mils to 0.2 mil, or more preferably from 3 mils to 1 mil, or most preferably 2 mils. Plastic sheet 14 of laminate 10 can be constructed from any of a wide range of synthetic or semi-synthetic organic, polymeric compounds that are malleable and moldable into solid objects. Preferably, plastic sheet 14 is a thermoplastic polymer sheet such as a polyethylene terephthalate (PET) or a polypropylene sheet having a thickness of 35 mils to 15 mils, or more preferably of 25 mils to 18 mils, or most preferably 20 mils.

First laminate 10 can be produced using any method or apparatus known in the art of laminating including, for example, flatbed lamination machines. A suitable flatbed lamination machine for producing first laminate 10 is shown and described in U.S. Pat. No. 6,227,271, the entire contents of which are incorporated herein by reference. Suitable flatbed lamination machines are also available from Glenro, Inc., 39 McBride Ave., Paterson, N.J. 07501-1799. Flatbed lamination machines operate by adhesively laminating adjacent surfaces of two lengths of material to each other using heat and pressure, where the materials are provided in the forms of rolled sheets of material. As the rolled sheets of material are simultaneously unrolled, an adhesive is applied to a surface of one of the sheets of material. The sheets are then heated and pressed together and thereby adhesively laminated to form a laminate. In this manner, first laminate 10 can be prepared using a flatbed lamination machine by disposing an adhesive 15, such as a hot melt adhesive or an adhesive web, between a length of metal foil 12 and a length of plastic sheet 14 and applying heat and pressure to the combination whereby the length of metal foil 12 and the length of plastic sheet 14 are laminated together.

In addition to laminate 10, duct wall 100 further includes a thermally insulating layer 16 attached directly to plastic sheet 14. Thermally insulating layer 16 can be composed of any suitable insulation material known in the art, for example, fiberglass, mineral wool, foam board, polystyrene or polyisocyanate. Thermally insulating layer 16 may be an insulating foam layer, such as spray foam layer, that completely or partially covers a surface of plastic sheet 14. Alternatively, thermally insulating layer 16 can be non-foam based. Thermally insulating layer 16 can have an R-value of at least about 7. Thermally insulating layer 16 can include a polyurethane or any equivalent thereof or a cellulosic insulation. Depending on the type of insulation material used, thermally insulating layer 16 may be fixed to plastic sheet 14 of laminate 10 using an adhesive 17. Preferably, layer 16 has a thickness ranging from 500 mils to 2,500 mils, more preferably 1,000 mils to 2,000 mils, or most preferably 1,250 mils.

Figure 2:
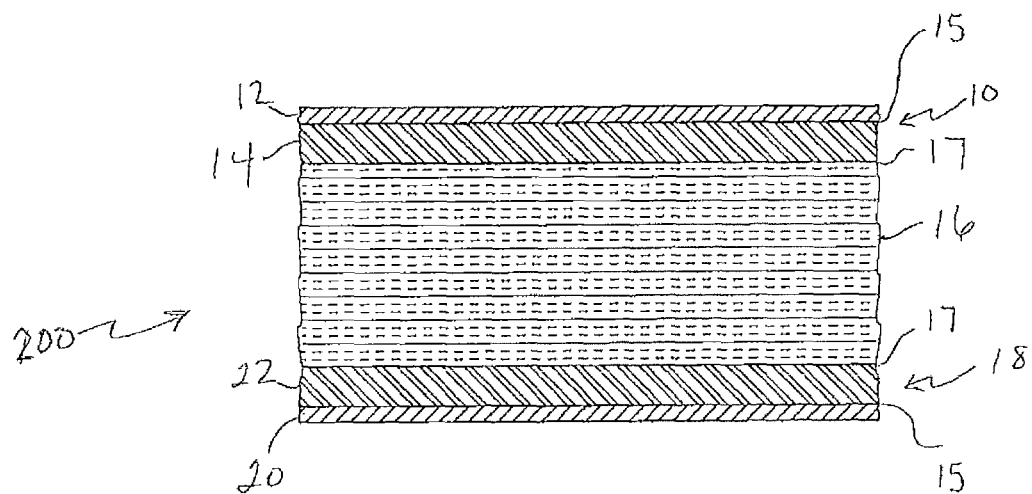
FIG. 2 is a sectional view of a duct wall in accordance with a second embodiment of the present invention.
Figure 3:
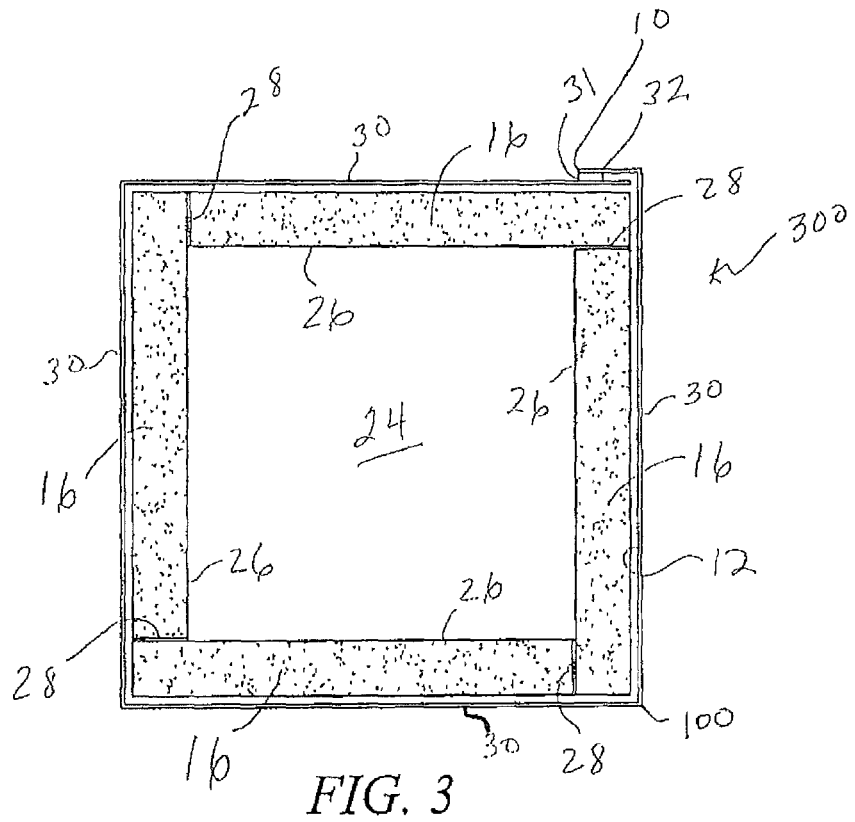
FIG. 3 is a sectional view of an HVAC duct formed by the duct wall of FIG. 1.

Referring to FIG. 2, thermally insulating layer 16 can be covered or enclosed by a second laminate 18 to provide duct wall 200. Second laminate 18 is composed of a metal foil 20 adhered to a plastic sheet 22 with adhesive 15 and is essentially identical to first laminate 10. Second laminate 18 is arranged with plastic sheet 22 disposed between thermally insulating layer 16 and metal foil 20. Arranged in this manner, the opposing flat surfaces of duct wall 200 are entirely covered by metal foil and therefore protected from fire.

Referring to FIG. 3, there is depicted a sectional view of an HVAC duct 300 arranged and constructed from duct wall 100. Duct 300 includes an elongate, central channel 24 configured for conveying forced air. The outward or axially-extending boundary 26 of channel 24 is defined by thermally insulating layer 16. Insulating layer 16 forms a continuous wall about channel 24 and may or may not include seams 28. First laminate 10 is concentrically arranged about channel 24 to form a tube, which may be open or closed at one or both ends. The tube has an exterior surface 30 composed entirely of metal foil 12, with the possible exception of a portion 31 of plastic sheet 14 that may be exposed at a seam 32 formed by an overlap of first laminate 10 with itself. If desired a flame-resistant paint can be applied to exterior surface 30 to further improve the flame-resistance of duct 300.

Figure 4:
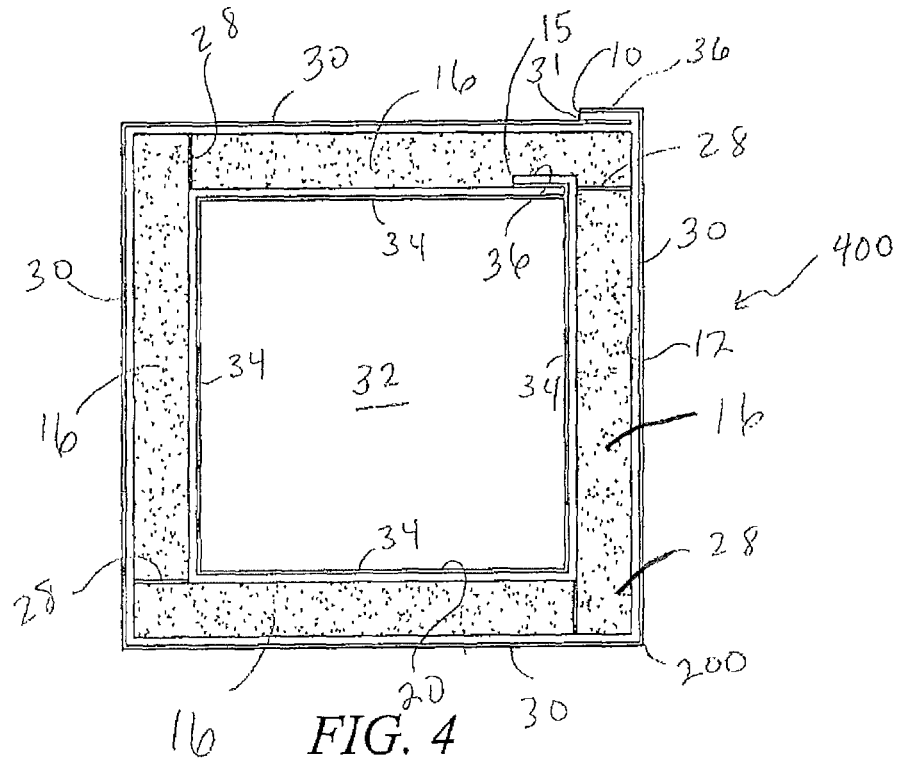
FIG. 4 is a sectional view of an HVAC duct formed by the duct wall of FIG. 2.
Figure 5:
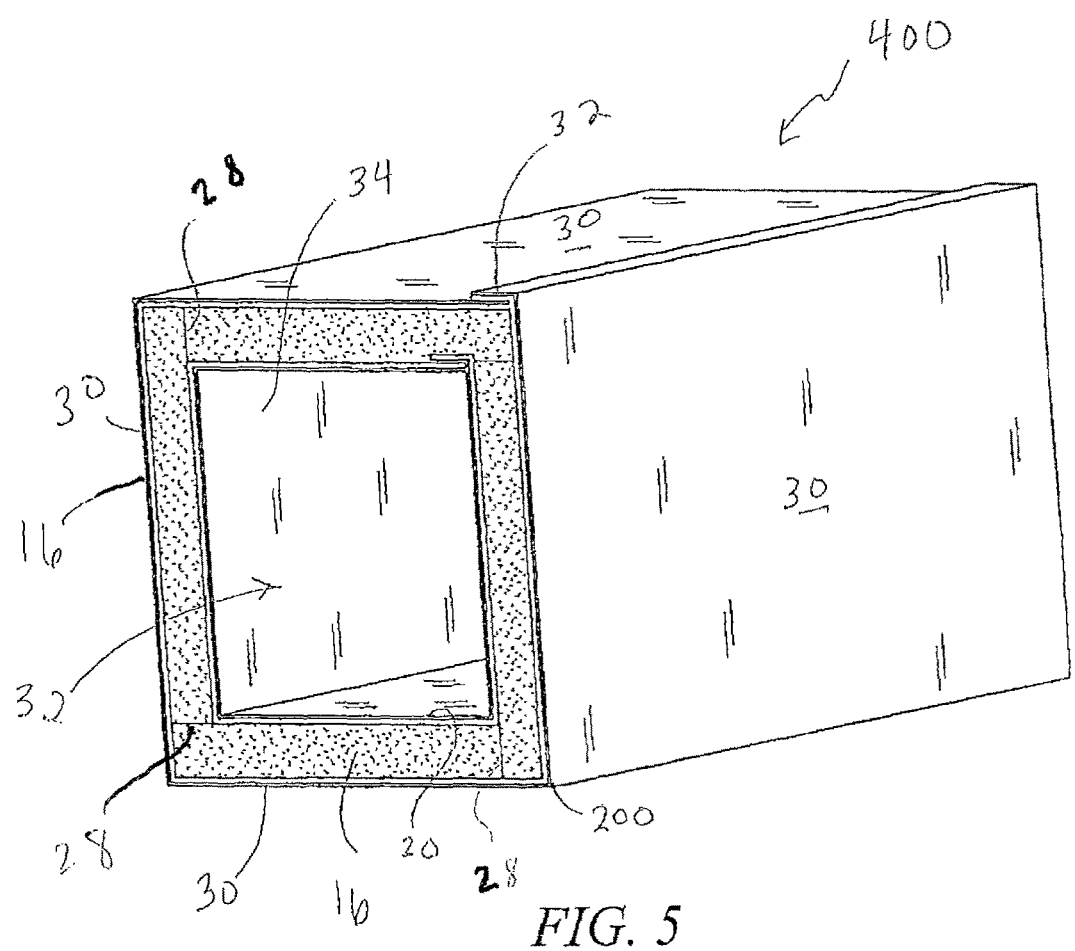
FIG. 5 is a perspective view of the HVAC duct of FIG. 4.

Referring to FIG. 4, there is depicted a sectional view of an HVAC duct 400 arranged and constructed from duct wall 200. Duct 400 includes an elongate, central channel 32 configured for conveying forced air. The outward or axially-extending boundary 34 of channel 32 is defined by metal foil 20. Metal foil 20 forms a continuous wall about channel 32. If desired a flame-resistant paint can be applied to metal foil 20 to further improve the flame-resistance of the interior surface of duct 300. Duct wall 200 and, more particularly, second laminate 18, thermally insulating layer 16 and first laminate 10, are concentrically arranged about channel 32 to form a tube. A seam 36 is formed by an overlap of second laminate 18 with itself. The tube includes exterior surface 30, which is composed entirely of metal foil 12, with the possible exception of portion 31.

Figure 7:
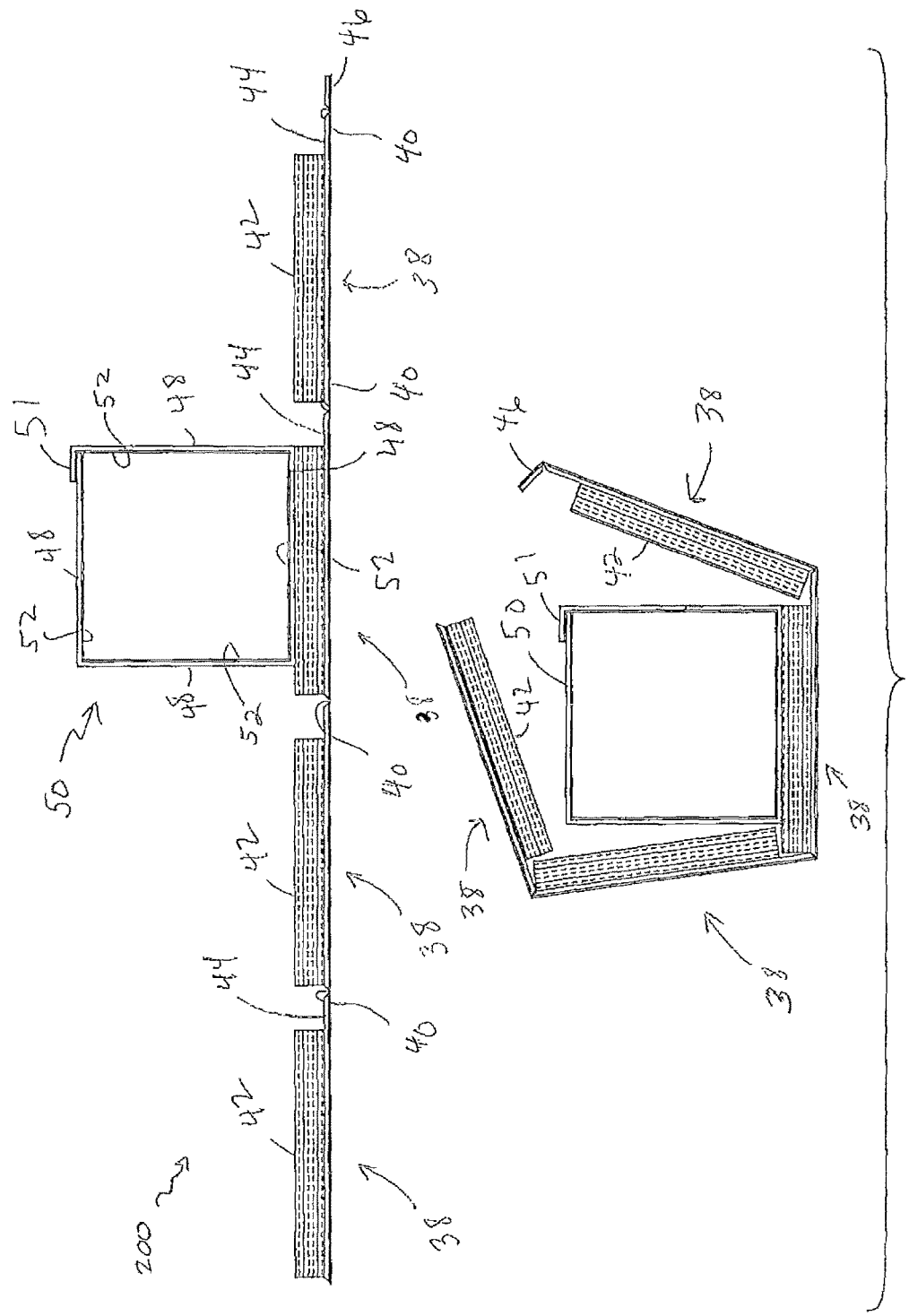
FIG. 7 is an elevational view of the HVAC duct of FIG. 4 in various stages of construction.

FIGS. 6 and 7 show HVAC ducts 300 and 400 in various stages of construction. While FIGS. 6 and 7 show ducts 300 and 400 being fabricated from a single section of first laminate 10 and single sections of first laminate 10 and second laminate 18, respectively, it is understood that ducts 300 and 400 can be constructed from multiple sections of first laminate 10 and second laminate 18. Thus, any portion of the HVAC duct can be formed from a same, structurally continuous piece or be separately fabricated and connected. For example, duct 300 may be constructed from four separate sections of first laminate 10 which are adhered to one another to form rectangular duct 300. Alternatively, duct 300 may be constructed from a seamless plastic tube to which metal foil is adhered to the exterior surfaces thereof. Additionally, duct 400 may be constructed by concentrically arranging two seamless plastic tubes, separated by a layer of insulation, wherein the outer surface of the outer tube and the inner surface of the inner tube are laminated with metal foil. The seamless plastic tubes may be extruded, centrifugally cast, molded or 3D-printed. Alternatively, duct 400 may be constructed from a seamless plastic tube to which metal foil is adhered to the exterior and interior surfaces thereof.

Referring to FIG. 6, HVAC duct 300 may be prepared from a single, elongate, rectangular piece of first laminate 10 delineated into four parts 38 by four V-shaped indentations 40 formed within first laminate 10 by removing portions of plastic sheet 14. Each V-shaped indentation 40 includes two sides arranged to one another at an angle of 90°. Adhered directly to plastic sheet 14 of each part 38 is an elongate, rectangular piece 42 of thermally insulating layer 16. Each piece 42 of thermally insulating layer 16 is arranged along a left edge of a respective part 38 so that a right portion 44 of plastic sheet 14 of each part 38 is uncovered. The length of each portion 44 is substantially equal to the thickness of the rectangular pieces 42 of thermally insulating layer 16. An adhesive is applied to portions 44 and, optionally, V-shaped indentations 40 and the opposing sides of each rectangular piece 42 of thermally insulating layer 16. Thereafter, first laminate 10 is folded at each of indentations 40 so that the adjacent parts 38 are arranged to one another at an angle of 90° to form duct 300. A seam portion 46 is provided at the right end of first laminate 10. Seam portion 46 includes no insulation and is arranged to overlap and adhere to the exterior surface of the adjacent part 38 in order to strengthen and maintain duct 300 in the desired form.

Referring to FIG. 7, HVAC duct 400 may be prepared from a single, elongate, rectangular piece of second laminate 18 delineated into four parts 48 by four V-shaped indentations formed within second laminate 18 by removing portions of plastic sheet 22. Each of the V-shaped indentations includes two sides arranged to one another at an angle of 90°. Second laminate 18 is folded at each of the indentations so that the adjacent parts 48 are arranged to one another at an angle of 90° to form a tube structure 50 having an interior surface 52 lined entirely by metal foil 20. A seam portion 51 is provided at the right end of second laminate 18. Seam portion 51 includes no insulation and is arranged to overlap and adhere to the exterior surface of the adjacent part 48 in order to strengthen and maintain tube structure 50 in the desired form. Thereafter, tube structure 50 is adhered to one of rectangular pieces 42 of thermally insulating layer 16 with one of parts 48 of second laminate 18 being coupled directly to one of pieces 42 of thermally insulating layer 16. An adhesive is then applied to portions 44 and, optionally, V-shaped indentations 40 and the opposing sides of each rectangular piece 42 of thermally insulating layer 16. Thereafter, second laminate 18 is folded at each of indentations 40 so that the adjacent parts 38 are arranged to one another at an angle of 90° to form a tube structure concentrically arranged about tube structure 50. Seam portion 46 is then arranged to overlap and adhere to the exterior surface of the adjacent part 38 in order to strengthen duct 400.

FIGS. 8 through 11 are directed to duct walls and HVAC ducts constructed therefrom that are fabricated from a laminate including a plastic layer disposed between two opposing sheets of metal foil. By disposing the plastic layer between opposing sheets of metal foil, sufficient tension is applied to the plastic to prevent shrinking of the plastic sheet which may occur during cooling of the laminate soon after its fabrication. Consequently, wrinkles which may form in the laminate when only a single layer of metal foil is laminated to the plastic layer are avoided.

Referring to FIG. 8, there is depicted a sectional view of duct wall 500. Duct wall 500 includes a first laminate 58 composed of a plastic sheet 60 disposed between an outer metal foil 54 and an inner metal foil 62 and secured there between adhesives 15, 64. Outer metal foil 54 is substantially similar to metal foil 12, and plastic sheet 60 is substantially similar to plastic sheet 14. Like metal foil 12 and plastic sheet 14, outer metal foil 54, plastic sheet 60, and inner metal foil 62 are laminated together using methods and apparatuses known in the art of laminating. Inner metal foil 62 can be any metal foil or metal alloy foil that, in combination with outer metal foil 54, is capable of withstanding shrinkage of plastic sheet 60 as it cools following lamination. In an exemplary embodiment, inner metal foil 62 is a sheet of aluminum foil. Preferably, inner metal foil 62 has a thickness ranging from 0.235 mils to 2 mils, or more preferably from 0.5 mils to 1.5 mils, or most preferably 1.0 mil. In addition to laminate 58, duct wall 500 further includes a thermally insulating layer 68 that is substantially similar to thermally insulating layer 16. Depending on the type of insulation material used, thermally insulating layer 68 may be attached to metal foil 62 using an adhesive 66.

Referring to FIG. 9, thermally insulating layer 68 can be covered or enclosed by a second laminate 70 to provide duct wall 600. Second laminate 70 is composed of a metal foil 76 adhered to a plastic sheet 74 with adhesive 15, wherein plastic sheet 74 is also adhered to a second metal foil 72 with adhesive 64. Second laminate 70 is essentially identical to first laminate 58. Second laminate 70 is arranged with second metal foil 72 disposed between thermally insulating layer 16 and plastic sheet 74. Arranged in this manner, the opposing flat surfaces of duct wall 600 are entirely covered by metal foil and therefore protected from fire.

Referring to FIG. 10, there is depicted a sectional view of an HVAC duct 700 arranged and constructed from duct wall 500. Duct 700 includes an elongate, central channel 78 configured for conveying forced air. The outward or axially-extending boundary 80 of channel 78 is defined by thermally insulating layer 68. Thermally insulating layer 68 forms a continuous wall about channel 78 and may or may not include seams 82. First laminate 58 is concentrically arranged about channel 78 to form a tube, which may be open or closed at one or both ends. The tube has an exterior surface 84 composed entirely of outer metal foil 54, with the possible exception of a portion 86 of plastic sheet 60 that may be exposed at a seam 88 formed by an overlap of first laminate 58 with itself. If desired a flame-resistant paint can be applied to exterior surface 84 to further improve the flame-resistance of duct 700.

Referring to FIG. 11, there is depicted a sectional view of an HVAC duct 800 arranged and constructed from duct wall 600. Duct 800 includes an elongate, central channel 90 configured for conveying forced air. The outward or axially-extending boundary 92 is defined by first metal foil 76. First metal foil 76 forms a continuous wall about channel 90. If desired a flame-resistant paint can be applied to first metal foil 76 to further improve the flame-resistance of duct 600. Duct wall 600 and, more particularly, second laminate 70, thermally insulating layer 68, and first laminate 58, are concentrically arranged about channel 90 to form a tube. A seam 94 is formed by an overlap of second laminate 70 with itself. The tube includes exterior surface 84, which is composed entirely of first metal foil 54, with the possible exception of portion 86.

In addition to preventing wrinkling of laminate 58, the addition of inner metal foil 62 facilitates the production of ducts 700 and 800 from a single, structurally continuous piece of duct wall 500. In particular, unlike the V-shaped indentions 40 shown in FIG. 6, which are formed by removing portions of plastic sheet 14 from duct wall 100, V-shaped indentions can be pressed into a single, structurally continuous piece of laminate 58 using a brake, a die, a heated die, by stamping or other similar device or method. This occurs without the removal of any material from the laminate.

As will be apparent to one skilled in the art, various modifications can be made within the scope of the aforesaid description. Such modifications being within the ability of one skilled in the art form a part of the present invention and are embraced by the claims below.

What is claimed:

1. An HVAC duct comprising:
a channel configured for conveying forced air, and
a duct wall forming the channel, the duct wall having an outer surface and an inner surface,
wherein the duct wall includes a first plastic layer disposed between a thermally insulating layer and a first metal foil or metal alloy foil layer,
wherein the first metal foil or metal alloy foil layer forms the outer surface of the duct wall, and further wherein the thermally insulating layer forms the inner surface of the duct wall, the inner surface defining a continuous boundary about the channel.

2. The duct of claim 1, wherein the thermally insulating layer has a thickness of from 500 mils to 2500 mils.

3. The duct of claim 2 further comprising a second metal foil or metal alloy foil layer disposed between the first plastic layer and the thermally insulating layer.

4. The duct of claim 2 being operatively coupled to a source of forced air.

5. The duct of claim 2, wherein the thermally insulating layer is composed of a material selected from fiberglass, mineral wool, foam board, polystyrene, polyisocyanate, and spray foam.

6. The duct of claim 2, wherein the first plastic layer is a thermoplastic polymer sheet.

7. The duct of claim 6, wherein the first plastic layer has a thickness of 15 mils to 35 mils.

8. The duct of claim 2, wherein the foil of the first metal foil or metal alloy foil layer is a stainless steel foil having a thickness of 0.2 mil to 5.0 mils.

9. The duct of claim 3, wherein the first plastic layer is adhesively laminated to the first metal foil or metal alloy foil layer and to the second metal foil or metal alloy foil layer, and an adhesive attaches the thermally insulating layer to the second metal foil or metal alloy foil layer.

10. The duct of claim 3, wherein the second metal foil or metal alloy foil layer has a thickness of from 0.235 mils to 2 mils.

11. The duct of claim 10, wherein the second metal foil or metal alloy foil layer is aluminum.

12. An HVAC duct comprising:
a channel configured for conveying forced air, and
a duct wall forming the channel, the duct wall having an outer surface and an inner surface,
wherein the duct wall includes a first plastic layer disposed between a thermally insulating layer and a first metal foil or metal alloy foil layer,
wherein the first metal foil or metal alloy foil layer forms the outer surface of the duct wall,
and further wherein the duct wall includes a second plastic layer disposed between the thermally insulating layer and a second metal foil or metal alloy foil layer, wherein the second metal foil or metal alloy foil layer forms the inner surface of the duct wall and defines a continuous boundary about the channel.

13. The duct of claim 12, further comprising:
a third metal foil or metal alloy foil layer disposed between the first plastic layer and the thermally insulating layer, and
a fourth metal foil or metal alloy foil layer disposed between the second plastic layer and the thermally insulating layer.

14. The duct of claim 12, wherein the thermally insulating layer has a thickness of from 500 mils to 2500 mils.

15. The duct of claim 14, wherein the thermally insulating layer is composed of a material selected from fiberglass, mineral wool, foam board, polystyrene, polyisocyanate, and spray foam.

16. The duct of claim 14, wherein the first plastic layer and the second plastic layer are each a thermoplastic polymer sheet.

17. The duct of claim 13, wherein the thermally insulating layer has a thickness of from 500 mils to 2500 mils.

18. The duct of claim 17, wherein the thermally insulating layer is composed of a material selected from fiberglass, mineral wool, foam board, polystyrene, polyisocyanate, and spray foam.

19. The duct of claim 17, wherein the first plastic layer and the second plastic layer are each a thermoplastic polymer sheet.

20. The duct of claim 13, wherein the third metal foil or metal alloy foil layer is an aluminum foil layer.

* * * * *